United States Patent Office 3,790,610
Patented Feb. 5, 1974

3,790,610
ORGANIC POLYMER CHELANTS FOR IRON
AND MANGANESE IONS
John C. Lum, Union, N.J., and Ronald F. Beyer, Concord, Calif., assignors to Colloids, Inc., Newark, N.J.
No Drawing. Filed Sept. 7, 1971, Ser. No. 178,119
Int. Cl. C07f 13/00, 15/02
U.S. Cl. 260—429 J     5 Claims

ABSTRACT OF THE DISCLOSURE

Process for soluble polymeric chelates of iron and manganese which comprises reacting iron and/or manganese ions with polymers and copolymers based on organic monomeric acids, the polymers and copolymers preferably having relatively low molecular weights of less than 50,000, the chelation process being applicable at a wide range of pH values of the ion containing solution, compositions of polymeric chelates prepared thereby, and uses therefor.

---

This invention relates generally to novel chelating agents for iron and/or manganese, to the products produced thereby, and chelation processes and uses thereof and more particularly to the use of polymers and copolymers of organic monomeric acids having relatively low molecular weights as chelating agents for iron and/or manganese ions to prevent precipitation of solid products thereof.

It is known that various metal ions have the ability to react with organic compounds especially those having at least two functional or reactive groups to produce a chelate structure or chelate complex with the metal ions. The formation and chemistry of these compounds has been widely studied and developed. These compounds often form insoluble chelate structures with selective metal ions thereby giving precipitates which can be isolated. In other instances, they react to form soluble complexes, and are accordingly sometimes called sequestering agents, that is, they hold the ions in solution or suspension. Generally, the organic chelating agent, usually called the ligand or chelant, is more or less specific as the chelating agent for one or more metallic ions. This specificity is not predictable except in a very rough way taking into account such variables as the size of the metallic ion in relation to the molecular size and structure of the chelating groups on the ligand.

It is an object of this invention to provide novel chelating agents for iron and manganese ions.

It is another object of the invention to utilize the polymers and copolymers of certain organic monomer acids to form soluble chelates of metallic ions.

Another object is to use polymers and copolymers of such unsaturated organic acids as acrylic acid, methacrylic acid, maleic acid and the like as ligands to form chelates with iron and manganese ions.

A further object is to provide novel organic sequestering agents which are capable of acting over a wide range of pH values to maintain iron and manganese ions in solution in colorless forms.

Other and further objects will become apparent from a detailed description of the invention set forth hereinbelow.

It has been discovered that relatively low molecular weight organic monomeric acids form polymers and copolymers which are capable of chelating with iron and/or manganese ions to sequester them and maintain them in solution in colorless form.

The organic monomeric acids which form the basis of the polymers and copolymers used as the ligands in the invention are of the aliphatic or alicyclic groups and have relatively low molecular weight, having from 2 to 8 carbon atoms per molecule. It is desirable that the monomers have at least one free carboxylic group and a double bond capable of polymerization. Other groups can also be present, provided they do not interfere with polymer or copolymer formation, or the chelation reaction, and do not react independently with the iron and/or manganese ions or other ions or materials present.

Typical organic polymeric acids which have been found useful include the polymers of the acrylic family, i.e., polymers of acrylic acid and its derivatives. Thus, the organic polymeric acid can be polyacrylic acid, polymethacrylic acid, and the like. Copolymers of monomers of the acrylic family with organic carboxylic acids anhydrides or acid halides containing aliphatic carbon-to-carbon unsaturation can also be used. Examples of such polycarboxylic materials include the respective compounds of maleic, fumaric, substituted maleic and fumaric such as citraconic, chloromaleic, and mesaconic; substituted succinics such as aconitic and itaconic and the like. Maleic acid-methacrylic acid and maleic acid-acrylic acid are typical of the copolymers which are useful.

Other monomer compounds can also be present in the polymers and copolymers. These include such compounds as ethylene, styrene, butadiene, isoprene, vinyl acetate, acrylates, acrylamide, methacrylamide, and the like.

It has been found important to use such polymers and copolymers having relatively low molecular weights. They should have a maximum average molecular weight of 75,000 and for best results the average molecular weight should be between 5,000 and 50,000.

The preparation of the polymers and copolymers of the organic monomer acids is readily carried out by processes well known in the chemical and polymer arts and there is nothing critical in their manufacture for use in the invention. It is, of course, necessary that the molecular weight of the polymers and copolymers be controlled to within the required range. In general, the acid number of the polymer or copolymer is in the range of about 600–1000.

The invention has numerous advantages over similar processes and products described in the prior art. The process itself is carried out with readily available chemicals and the requirement for the chelants used are less per unit of the metal ion, i.e., iron and/or manganese present than for other known chelants for these metal ions. The polymers and copolymers used as reactants exhibit and maintain their effectiveness and prevent the precipitation of iron and/or manganese ions under a wide variation of conditions particularly in mixtures having high (above 8) pH values at which values most known and used chelants for iron and manganese and heavy metal ions generally show reduced chelating power and in some cases are totally ineffective.

In general, these polymers and copolymers of the organic acids have been found to be effective as chelants over a pH range of 2 to 14. They have also been found to function in forming chelates and preventing precipitation of the iron and/or manganese ions when used in concentrations of about 2 to 20 times the weight of the iron or manganese ions. Preferably, the concentration is about 5 to 10 times by weight. The concentrations given are based on the total concentration of all iron and manganese present in the solutions treated. For best results, the concentration should be at least 5 times that of the selected polymer or copolymer by weight of the metal present. It is an especial advantage of these chelating agents that they function well in sequestering and maintaining in complete solution even low concentrations of iron and/or manganese ions. They are effective for solutions having the metal ion concentration as low as one part per million.

It has been found that these polymers and copolymers of the organic acids are able to prevent precipitation and flocking of iron and/or manganese ions in the presence of various other metallic ions such as calcium, magnesium, and the like, as well as in the presence of various other impurities and contaminants which interfere with or inhibit chelation, complexing or other reactions of known materials.

These novel chelants for iron and/or manganese are useful in the paper industry to prevent loss of brightness because of the presence of iron and/or manganese in the wood pulp. For example, use of the polymer ligand in the ground wood pulp process for making pulp enhances the brightness of the finished paper by the more effective chelation of iron and/or manganese.

In connection with the use of caustic soda solutions, these chelants can be employed to remove iron complexes such as rust from steel or iron surfaces, for cleaning of rust iron phosphates, or the iron compounds from processing equipment where there is danger of removal of some of the base metal.

These chelants can also be satisfactorily used for removal of light iron oxide films as they hold the iron and/or manganese so removed in solution.

The invention will be illustrated in detail by the following examples thereof, although it is in no way intended to limit the invention thereto.

EXAMPLE 1

A series of comparative tests was carried out to determine the effectiveness of various materials as chelation agents for iron. The chelant of Sample A is polymeric acrylic acid having a molecular weight of 32,000, a material typical of the invention; Sample B is nitrilotriacetic acid; Sample C is sodium salt of ethylene diamine tetraacetic acid; and Sample D is the pentasodium salt of diethylenetriaminopentaacetic acid. All the Samples A–D and the control were adjusted to a minimum pH of 11.3 with $NH_3$ and ferric ion was added at the concentration of 1 g./l. as $FeCl_3$ solution in equal quantity in all cases. Adjustment was made where necessary to equate the pH values. In the cases of Samples C and D the pH adjustment was not necessary because of the high pH of the chelant.

TABLE I

| Sample No. | A | B | C | D | Control blank |
|---|---|---|---|---|---|
| Chelant pH | 1.8 | 11.8 | 11.8 | 11.8 | 7.0. |
| Chelant concentration | 18 g./l | 18 g./l | 18 g./l | 18 g./l | 0. |
| pH in test solution | 11.3 | 11.3 | 11.3 | 11.8 | 11.3. |
| Initial appearance | Clear dark amber | Very turbid | Very turbid | Very turbid | Very turbid. |
| Appearance after standing | do | Amber w/split | Very light amber w/split | Light amber w/split | Water-white w/split. |
| Split | None | ½" heavy | 1½" light | 1½" light | 1⅝" light. |

The results of this test as indicated by the appearance of the solutions after standing shows the superiority as chelating agent of the polymeric acrylic acid, Sample A, in the series. The final appearance of Sample A is a clear amber solution. While all the samples of known chelants including Samples B, C and D, using materials of the prior art after standing had a turbid appearance and a split with more or less of two layers.

These results obtained using known materials in Samples B, C and D are in fact only comparable with results in the control sample or blank to which no chelating or complexing material was added.

EXAMPLE 2

The experiment of Example 1 was repeated with one variable change. The pH was adjusted to 8.2 to make a comparison test with the optimum range for the chelants of Samples C and D.

TABLE II

| Sample number | A | B | C | D | Control (blank) |
|---|---|---|---|---|---|
| Chelant concentrate | 18 g./l | 18 g./l | 18 g./l | 18 g./l | 0. |
| pH in test solution | 8.2 | 8.2 | 8.2 | 8.2 | 8.2. |
| Precipitation time | Stable | 18 hrs | 36 hrs | 24 hrs | 1 min. |
| Precipitation | None | ¼" very heavy | ⅜" | ¾" | ¾". |

Once again it is to be noted that Samples B, C and D containing known chelants showed precipitates after the elapse of 18–36 hours, and the blank showed precipitate formation in less than 1 minute. The polymeric acrylic acid prevented completely the formation of a solid precipitate.

EXAMPLE 3

After completion of the fixed high alkaline tests described in Examples 1 and 2 the pH of each of the following samples was adusted to 8.0:

Sample:
 #1—18 g./l. A in 1 g./l. Fe as $FeCl_3$
 #2—18 g./l. D in 1 g./l. Fe as $FeCl_3$
 #3—18 g./l. C in 1 g./l. Fe as $FeCl_3$ Each of the three solutions (200 g.) was titrated with concentrated aqueous $NH_3$ until a reddish brown precipitate formed. The pH was recorded at the point when this precipitate first appeared.

Sample:
 #1—No precipitate through pH 11.3 (over 11.0 a flock or suspended material appeared to form, but this does not precipitate)
 #2—Precipitate in volume at pH 10.3
 #3—Precipitate in volume at pH 10.5

This experiment clearly indicates that the polymeric organic acid of the invention is able to sequester the iron ions at a much higher pH and thereby prevent formation of a precipitate than are the two compounds (chelants) of the prior art.

EXAMPLE 4

Each of the three samples from Example 3 above and two other examples of the invention identified as shown, was adjusted to pH 8.0 and maintained there with additions of $NH_3$ whenever the pH fell below 7.8. $FeCl_3$ solution (1g./l. Fe) was added to each of the 200 g. test solutions until the particular chelant present could not control the iron and a flock or precipitate formed. The total volume of $FeCl_3$ in each case was:

Sample:
 #1—400 cc. (suspended flock, but no precipitate)
 #2—105 cc. heavy precipitate
 #3—150 cc. heavy precipitate
 #4—400+ cc. flock formed in suspension
 #5—400+ cc. flock formed in suspension The composition of the copolymers of Samples 4 and 5 are shown as follows in Table III.

TABLE III

| Sample number | 4 | 5 |
|---|---|---|
| Maleic acid, percent | 25.0 | 48.0 |
| Methacrylic acid, percent | | 35.5 |
| Acrylamide, percent | | 16.5 |
| Acrylic acid, percent | 75.0 | |
| 30% solids viscosity, cps | 16 | 50 |

Sample 4 is a copolymer of maleic acid and acrylic acid and Sample 5 is a maleic acid-methacrylic acid-acrylamide terpolymer. Both polymers are of relatively low molecular weights as indicated by their 30% aqueous solution viscosities shown above.

EXAMPLE 5

The ability of polymeric acrylic acid to remove iron oxide from steel in an alkaline media was checked to determine if such a process would be feasible.

A solution of 100 g. NaOH/l. and 20 g. of the polymer acid was formulated and heated to boiling. A length of very rusty steel chain was immersed and observed over a one hour period. After one hour rust particles were noted on the bottom of the beaker and the chain showed evidence of descaling.

EXAMPLE 6

The tests of Example 1 were repeated with the substitutions of $MnSO_4$ for the $FeCl_3$ to compare the ability of the invention materials to chelate manganese. It was found that the quantity of precipitate from a 1 g./l. $Mn^{++}$ solution was not sufficient for comparison so the $Mn^{++}$ concentration was increased to 10 g./l.

The above tests show that Sample A gives no precipitate while Samples B, C, D and E all show evidence of precipitation.

EXAMPLE 7

The tests of Example 4 were repeated with the substitution of $MnSO_4$ for $FeCl_3$ and the concentration was doubled to 2 g./l. $Mn^{++}$ to facilitate a substantial end point. In this case the results were very similar to those reported in Example 4.

What is claimed is:

1. A process for rendering and maintaining metallic ions soluble which comprises adding to a solution containing metallic ions selected from the group of iron, manganese and mixtures thereof, a chelant consisting of a copolymer of maleic acid and acrylic acid and having a molecular weight of less than 75,000.

2. The process of claim 1 wherein the chelant has a molecular weight between 5000 and 50,000.

3. The process of claim 1 wherein the treatment is carried out under alkaline conditions.

4. The process of claim 1 wherein the chelant is used at a concentration of 5 to 10 times the weight of metallic ion present.

5. The process of claim 1 wherein the copolymer contains 25% maleic acid.

TABLE IV

| Sample No. | A | B | C | D | E (control) |
|---|---|---|---|---|---|
| Chelant concentrate | 18 g./l. | 18 g./l. | 18 g./l. | 18 g./l. | 0. |
| Neutral pH in test | 11.3 | 11.3 | 11.8 | 11.8 | 11.3. |
| Initial appearance | Milky white | White flock | White flock | White flock | White flock. |
| Appearance on standing | do | Tan precipitation | Tan precipitation | Tan precipitation | Brown precipitation. |
| Split | None | ⅜″ heavy | ¼″ heavy | ¼″ heavy | ½″ heavy. |

References Cited

UNITED STATES PATENTS

| | | | |
|---|---|---|---|
| 3,055,873 | 9/1962 | Hull et al. | 260—784 R |
| 3,285,886 | 11/1966 | Gunderson et al. | 210—58 |
| 3,405,060 | 10/1968 | Carter et al. | 210—58 |
| 3,463,730 | 8/1969 | Booth et al. | 252—180 |
| 3,514,376 | 5/1970 | Salutsky | 252—180 |
| 3,578,589 | 5/1971 | Hwa et al. | 252—180 |
| 3,663,448 | 5/1972 | Ralston | 252—180 |
| 3,085,916 | 4/1963 | Zimmie et al. | 210—58 |

FOREIGN PATENTS

| | | |
|---|---|---|
| 1,015,612 | 1/1966 | Great Britain. |
| 1,068,037 | 5/1967 | Great Britain. |

DANIEL E. WYMAN, Primary Examiner

A. P. DEMERS, Assistant Examiner

U.S. Cl. X.R.

134—3; 210—58; 252—180; 260—80 L, 80 P, 439 R